United States Patent
Yacono

(10) Patent No.: US 8,095,131 B2
(45) Date of Patent: Jan. 10, 2012

(54) DYNAMIC BOOLEAN CHANNEL MASKS

(75) Inventor: John J. Yacono, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 879 days.

(21) Appl. No.: 12/055,928

(22) Filed: Mar. 26, 2008

(65) Prior Publication Data
US 2009/0247206 A1  Oct. 1, 2009

(51) Int. Cl.
*H04W 4/00* (2009.01)
(52) U.S. Cl. ............ 455/434; 455/67.11; 370/329
(58) Field of Classification Search ............... None
See application file for complete search history.

(56) References Cited

U.S. PATENT DOCUMENTS

| | | | |
|---|---|---|---|
| 6,002,918 A | 12/1999 | Heiman et al. | |
| 7,907,564 B2 * | 3/2011 | Laux et al. | 370/329 |
| 2006/0142004 A1 * | 6/2006 | He et al. | 455/434 |

* cited by examiner

*Primary Examiner* — Erika Gary

(57) ABSTRACT

Systems and methods are provided to establish a set of dynamic channel masks that select channels to be scanned in a wireless environment during a mobile terminal roaming. The set of channel masks is associated with a set of scan groups determined through a Boolean operation applied to a set of scan variables determined via data indicators that reflect channel quality and/or presence in the vicinity of the mobile terminal. Regardless of actual access point geometric configuration in a quasi-two-dimensional coverage plan, a universal set of three scan groups can be determined. In addition to the universal set, a fail-safe set is computed in order to ensure successful scanning in various roaming scenarios. Quality of service indicators like communication reliability and battery performance can be improved by successively scanning the universal scan groups during roaming.

14 Claims, 14 Drawing Sheets

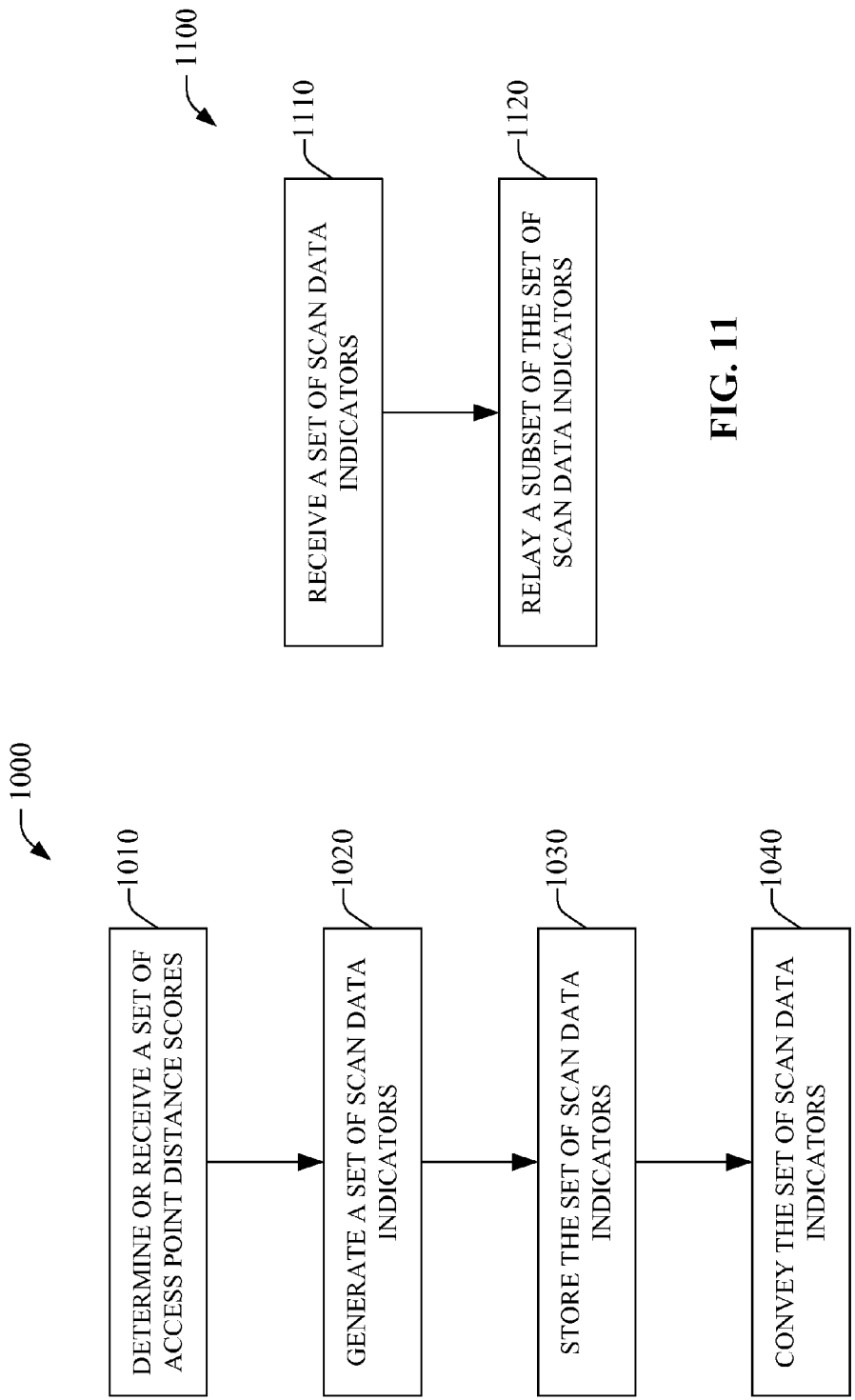

DYNAMIC BOOLEAN CHANNEL MASKS

TECHNICAL FIELD

The subject specification relates to wireless communications and, more particularly, to generation through Boolean algebra of dynamic channel masks for scanning frequency resources.

BACKGROUND

Technological advances and market forces have rendered wireless communication nearly ubiquitous in modern societies. Aggressive competition for market share among wireless service providers has commoditized wireless services. Service and product branding, as well as degree of customer satisfaction have become a differentiator that drives consumers towards specific service providers. Therefore, quality of service not only can drive product differentiation but it can dramatically reduce customer attrition.

To ensure an elevated level of quality of service, providers typically enable roaming of wireless devices among base stations. While the object of roaming is to retain a communication (e.g., voice, video, on-line gaming, music, etc.) when moving throughout areas of coverage, roaming implementations can actually be detrimental to the communication. In particular, excessive or frequent scanning of communication channels can render the roaming device temporarily inaccessible to an application running thereon and it can additionally cause poor battery performance, with the ensuing detrimental effects in quality of service and general user experience. In particular, voice applications or video streaming applications are prime examples of applications that are negatively impacted by interrupted access to the radio transceiver in a device.

It should be appreciated, nonetheless, that roaming in itself is not intrinsically detrimental. Instead, the source of deteriorated quality of service in roaming devices can be associated with poorly planned, indiscriminate scans on each communication channel available to the wireless device. Therefore, there is a need in the art for an efficient channel scanning mechanism that facilitates retaining a communication through roaming while preserving an elevated quality of service.

SUMMARY

The following presents a simplified summary of the innovation in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the innovation in a simplified form as a prelude to the more detailed description that is presented hereinafter.

Disclosed herein are systems and methods that facilitate establishing a set of dynamic channel masks that select channels to be scanned in a wireless environment in preparation for roaming. In an aspect, the channel masks are determined through a group of Boolean operations applied to a set of scan data indicators supplied by the wireless infrastructure.

In an aspect of the subject innovation, a wireless access point or access port (e.g., a cell-tower transceiver, IEEE 802.11x access point, and the like) in the infrastructure conveys a data indicator, which enumerates the channels supported by the wireless point or access port and associated closest neighbor access points or access ports. A data indicator is a binary sequence in which each binary bit is set to a "1" if a specific channel is operational in the vicinity of the infrastructure transceiver, or set to a "0" if a specific channel is not operational in the vicinity of the infrastructure transceiver.

In another aspect, a mobile device receives a set of data indicators and selects a subset of the received data indicators based at least in part on the signal quality of the transceiver that transmitted a data indicator in the set of data indicators. The selected subset of data indicators is utilized to generate a set of scan variables, which are typically dynamic as a result of dynamic variations in channel signal quality or availability. Boolean operations are performed on the scan variables to transform them into a set of dynamic, binary channel masks that are relevant to the mobile device's vicinity.

In yet another aspect, regardless of actual access point deployment arrangement geometry or number of channels in a quasi-two-dimensional coverage plan, a universal set of three scan groups can be determined through the Boolean operations described in the subject innovation. In addition to the universal set, a fail-safe set is also computed in order to ensure successful scanning in various roaming scenarios. Through conditional channel scanning according to the computed universal scan groups, improved quality of service indicators like communication reliability and battery performance are expected by reducing the impact of channel scanning on radio operation.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 10 presents a flowchart of an example method for generating a set of scan data indicators in accordance with aspects disclosed herein.

FIG. 11 presents a flowchart of an example method to convey scan data indicators according to an aspect disclosed herein.

DETAILED DESCRIPTION

Figure 1:
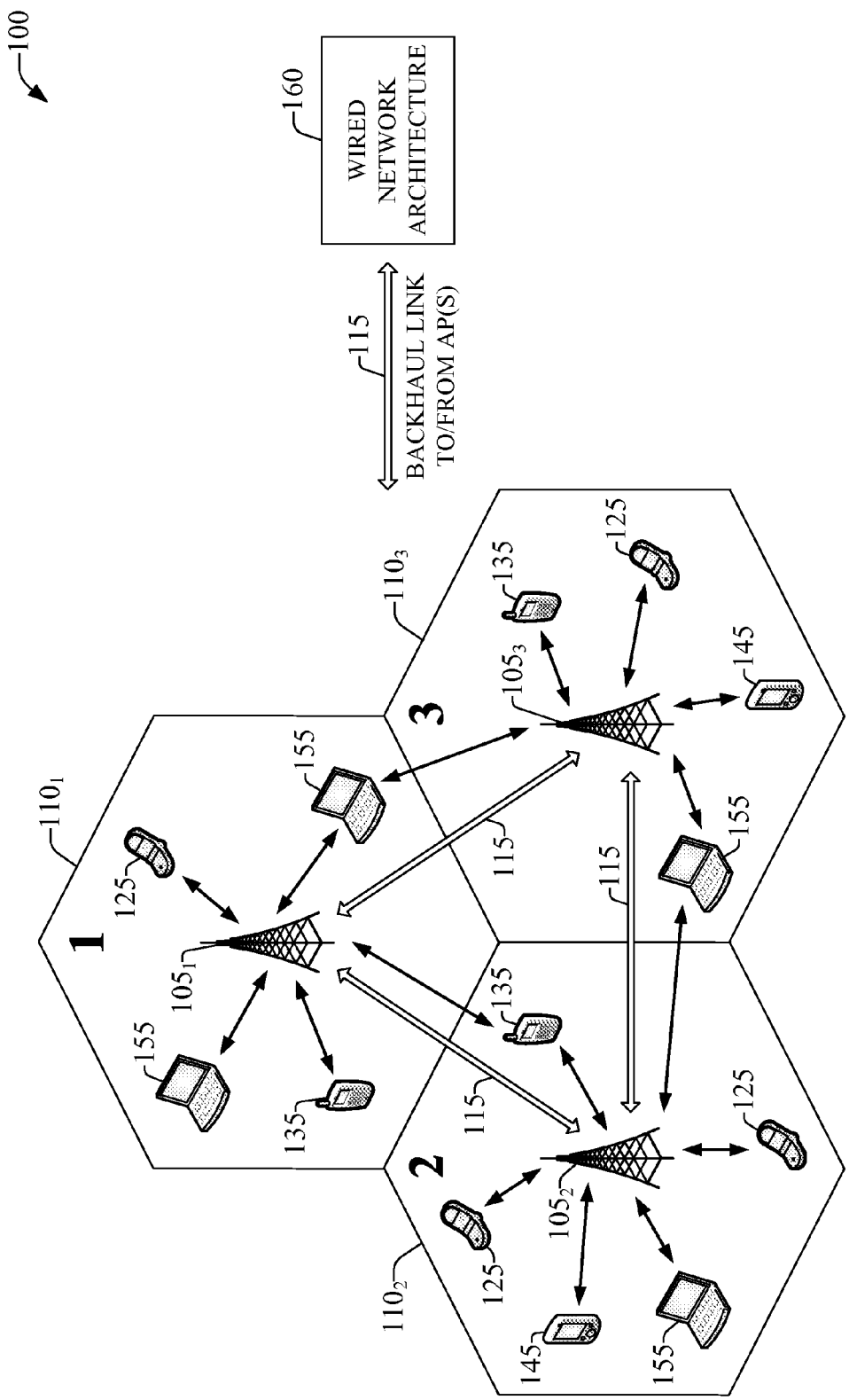
FIG. 1 illustrates an example wireless communication system that exploits communication aspects set forth herein.

The subject innovation is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "system," and the like are intended to refer to (i) a computer-related entity or (ii) an entity related to an operational machine with one or more specific functionalities. The entities referred herein can be either hardware, a combination of hardware and software, software, or software in execution. For example, a component can be, but is not limited to being, a process running on a processor, a process running on multiple processors, a processor, an executable, a thread of execution, code object, a program, or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). In the subject description the terms "scan data generator" and "scan data generator component," "scanner" and "scanner component," and "scan group generator" and "scan group generator component" are employed interchangeably.

In addition, it is noted that in the subject specification the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Furthermore, the articles "a" and "an" as used in the subject disclosure and the appended claims should generally be construed to mean "one or more" unless specified otherwise or clear from context to be directed to a singular form.

In the subject disclosure, systems and methods are described that facilitate establishing a set of dynamic channel masks that select channels to be scanned in a wireless environment during terminal roaming. The set of channel masks is determined through a Boolean operation applied to a set of scan variables determined via data indicators that reflect channel quality and availability in the vicinity of the mobile terminal. Regardless of actual access point geometric configuration or number of channels in a quasi-two-dimensional coverage plan, a universal set of three scan groups can be determined. In addition to the universal set, a fail-safe set is computed in order to ensure successful scanning in various roaming scenarios including dynamic changes in the infrastructure or errors in the configuration thereof. Quality of service indicators like communication reliability and battery performance can be improved by conditionally scanning the universal scan groups to gather reconnaissance for roaming. Details of these aspects are discussed next.

FIG. 1 illustrates an example wireless communication system 100 that exploits dynamic Boolean channel masks when scanning for frequency resources to retain traffic via roaming. System 100 includes multiple base stations $105_1$-$105_3$ and multiple wireless devices 125, 135, 145, and 155. Wireless devices 125, 135, 145, and 155, can be dispersed throughout the wireless system 100, e.g., in the multiple coverage areas $110_1$-$110_3$. The service cell is hexagonal, but it should be appreciated that service cell shape is dictated by the particular configuration of access points that cover a specific area of service. It should be appreciated that the conventional unit cell for a triangular lattice is a triangle having as vertices any three access points. Moreover, it is noted that substantially any geometric arrangement of access points in a two-dimensional surface can be divided into triangles (e.g., the underlying lattice of APs can be triangulated). Thus, aspects disclosed herein are illustrated with a regular triangular lattice as a model wireless cellular network topology, even though it is to be noted that the Boolean channel masks algorithm will function and provide benefit with any two dimensional arrangement of access points.

Each of such wireless devices can be stationary or mobile. At any instant, a wireless device (e.g., device 125, 135, 145, 155) can communicate with any number of base stations 105—for example, laptop computer 155 located within the confines of cell $110_1$ communicates with base station $105_1$ and $105_3$. Alternatively or in addition, at any instant communication between any such device and a base station can be severed, either as a part of a communication protocol (terminal enters "sleep," or power saving, mode) or as a result of channel degradation. By way of non-limiting example, a base station 110 can be an access point, a Node B, or another appropriate network entity. Each base station $105_1$, $105_2$ or $105_3$ provides communication coverage for a particular geographic area $110_1$, $110_2$, or $110_3$. As used herein and generally in the art, the term "cell" can refer to a base station (e.g., $105_1$, $105_2$ or $105_3$) or its coverage area (e.g., $110_1$, $110_2$, or $110_3$) depending on the context in which the term is used. In the subject specification, a wireless device (e.g., device 125, 135, 145, or 155) that operates in system 100 is interchangeably referred to as an access terminal (AT), or a terminal; a mobile station; a user equipment; a subscriber station; or substantially any other term utilized in the art to describe a device that operates in a wireless network in substantially the same manner an access terminal operates. As an example, a wireless device can be a cellular phone, a laptop computer, personal digital assistant, a wireless modem, a handheld computer, or another appropriate device.

It is noted that to improve system capacity, coverage areas $110_1$, $110_2$, and $110_3$ corresponding, respectively, to base stations $105_1$, $105_2$, and $105_3$ can be partitioned into multiple smaller areas (not shown) termed sectors. Such sectors can be formed and covered by groups of antennas (not shown) at a serving base station or access point, through beamforming. It should be appreciated, however, that the various aspects disclosed in the subject specification can be employed in a wireless communication system having sectorized or unsectorized cells. Additionally, substantially all suitable wireless communication networks having any number of sectorized or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. Furthermore, the term base station is utilized interchangeably with terms such as access point, access port, cellular tower, cellular bridge, and the like.

In an aspect, wireless communication system 100 can exploit a wired network architecture 160 (e.g., an enterprise intranet, a factory plant floor network, a wide area network such as the internet or other packet based networks and subnetworks, circuit switched voice networks, and the like). Network architecture 160 can provide information to terminals 125, 135, 145, or 155, and can, but are not required to receive information thereof through communication with bases station via backhaul link(s) 165. Backhaul network communication 165 can also facilitate point-to-point communication between base stations that utilize wired network architecture 160.

In another aspect, access points (e.g., $105_1$, $105_2$, or $105_3$) and terminals (e.g., wireless devices 125, 135, 145, or 155) in system 100 can communicate data and control, or management, information through one or more data and control channels, and via in-band modulated frames (e.g., data frames, beacon frames, etc.). Data channels, or frames, utilized or conveyed in system 100 can be assigned to active terminals such that each data channel, or frame, is used by only one terminal at any given time. Alternatively, data channels, or frames, can be assigned to multiple terminals 120, which can be superimposed or orthogonally scheduled on a data channel. To conserve system resources, control channels utilized by system 100 can also be shared among multiple terminals 120 using, for example, code division multiplexing.

It should be appreciated that the dynamic Boolean channel mask generation described herein can be applied to substantially any wireless communication system, either point-to-point or multiple access system, that exploits division of the system bandwidth into one or more frequency carriers or channels, each of which containing one or more subcarriers. Accordingly, example system 100 can comprise one or more multiple-access schemes, such as but not limited to frequency-division multiple access (FDMA); orthogonal FDMA (OFDMA), as it is employed for example in Long Term Evolution (LTE), Ultra Mobile Broadband (UMB), and 802.11, 802.11a, and 802.11b/g systems; and single-carrier FDMA (SC-FDMA). System 100 can also combine such schemes with disparate multiple access schemes like code-division multiple access (CDMA), time-division multiple access (TDMA), carrier-sense multiple-access with collision avoidance (CSMA/CA), or substantially any other suitable multiple-access schemes. FDMA utilizes frequency division multiplexing (FDM), wherein transmissions for different terminals (e.g., devices 125, 135, 145, or 155) are modulated in disparate frequency channels, or subbands, which can be spectrally overlapping (e.g., in 802.11b/g the bandwidth is divided in 11 channels separated by 5 MHz, with spectral width of 22 MHz; channels 1, 6 and 11 are effectively spectrally separated). In OFDMA, bandwidth can be split in multiple subbands with disparate orthogonal subcarriers (e.g., tones, or bins), each of which can be modulated with data for communication. In addition to FDM, system 100 can employ code division multiplexing (CDM), wherein transmissions for multiple terminals can be orthogonalized using different orthogonal codes (e.g., Walsh-Hadamard codes, Barker code, etc.) even though they are sent in the same frequency channel, or subband, or subcarrier.

As described in greater detail below, construction of Boolean channel masks relies on a set of scan data indicators (SDIs); e.g., a binary sequence that indicates a set of channels used near an access point, such as $105_1$. SDIs can be supplied to the access points in a wireless system (e.g., system 100) or network manually or they can be automatically generated and distributed by the network components. How either of these processes is carried out is dependent on the type of wireless network in question. For example, in some networks each access point is autonomous, in other networks, multiple access points are under the management and operational control of one or more network switches or other management devices.

Manual configuration.—To manually configure the scan data indicators in a network of autonomous access points, each access point is provided a scan data indicator that conveys a set of channels in use by itself and its nearest neighbors with regard their position on a floor plan. Alternatively, to manually configure the SDIs in a network of centrally controlled access points, a network switch or a cluster of network switches or substantially any network management device can be configured with scan data indicators for substantially all access points in the network, each of the SDIs conveys the channels utilized by an access point (e.g., AP $105_1$) and its nearest neighbor access points (e.g., AP $105_2$ and AP $105_3$) on a floor plan. In an aspect, entry of the signal-data-indicator data in a centrally-managed wireless infrastructure can be enhanced if the management console allowed importation of a floor plan where on a network operator can provide the position of each AP in the network, leaving the management system to determine access point channel allocation, which is stored in a system's memory, and access point adjacency, which the management system can determine from the marked floor plan, to generate the scan data indicators.

Figure 2A:
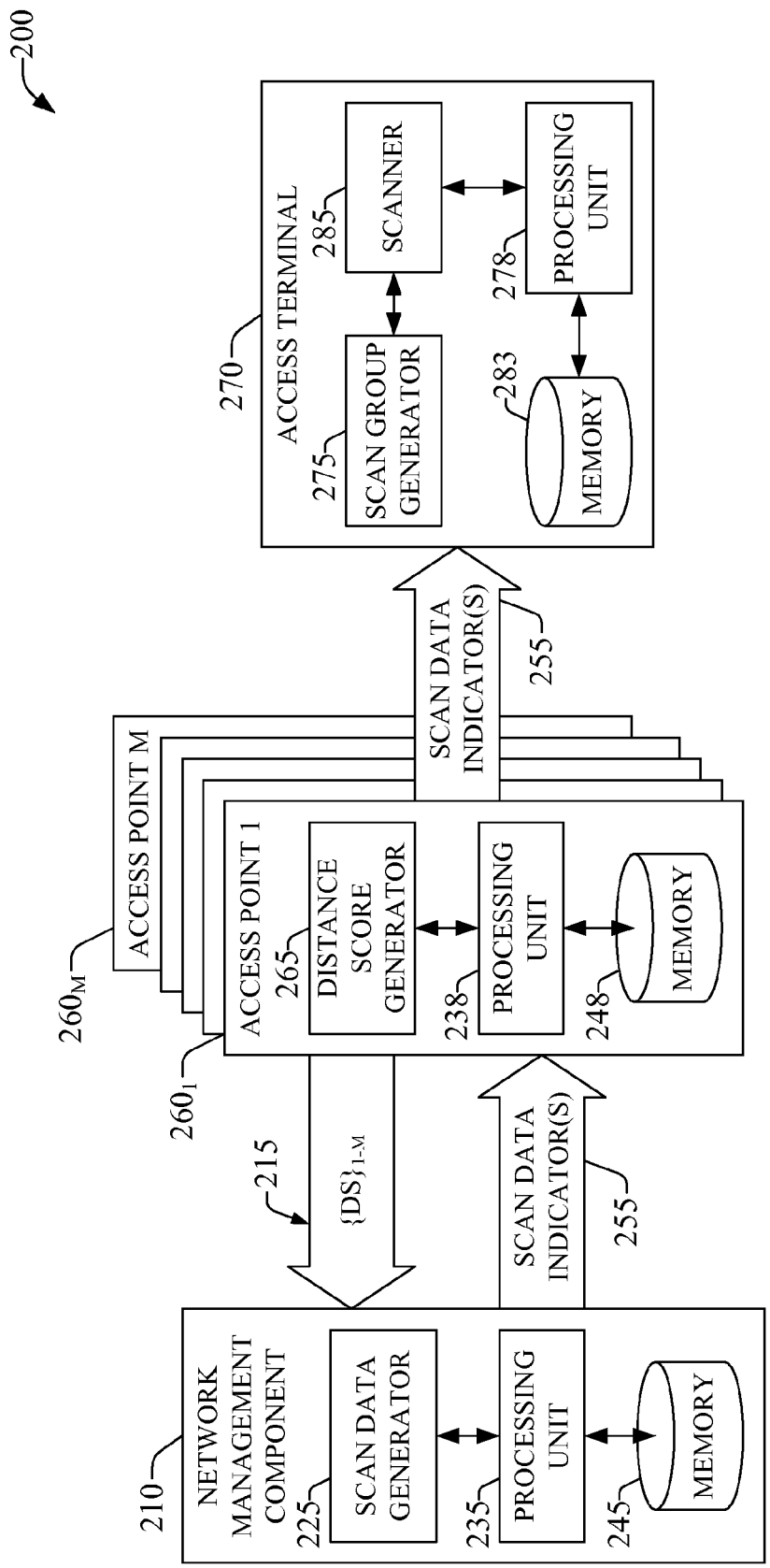
FIGS. 2A and 2B illustrate example systems that operate in a wireless environment and generate and exploit a set of Boolean channel masks in accordance with aspects set forth in the subject specification.
Figure 2B:
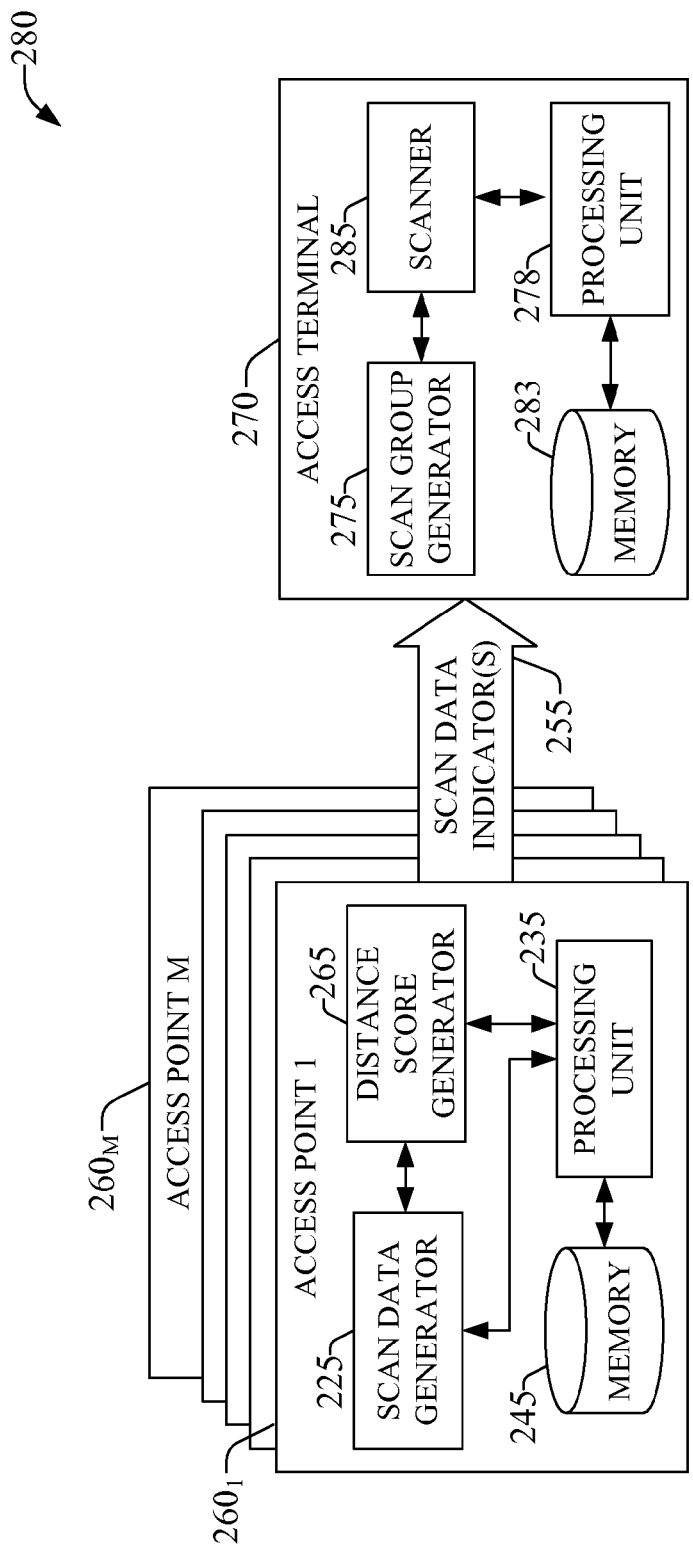

Automatic generation.—To automatically generate scan data indicators, a wireless network typically measures channel signal strength in the wireless environment to determine access point adjacency. FIGS. 2A and 2B illustrate, respectively, example systems 200 and 280 that operate in a wireless environment and generate and exploit a set of Boolean channel masks. Example system 200 relies on a central network management component 210 to generate a set of scan data indicators that are utilized to generate dynamic Boolean mask. Alternatively, or in addition, system 280 relies on generation of scan indicators at the access point level. Details of example systems 200 and 280 are discussed next. In example system 200 in FIG. 2A, each access point in the set of access points $260_1$-$260_M$ (M a positive integer) actively or passively monitors the signals of disparate access points in its vicinity to determine their relative distance. A distance score generator 265 in an access point $260_J$ ($1 \leq J \leq M$) assigns a set of neighbors APs an inter-AP distance score (DS) based at least in part on a set of channel quality metrics like signal delay, signal-to-noise ratio (SNR), signal-to-interference-and-noise ratio (SINR), wherein interference can be other cell/sector interference (OSI), intracell or co-channel interference, and so on. Alternatively, or in addition, other quality metrics, or indexes, can be utilized to assess channel signal quality, such as the ratio of received over lost beacon frames or the level of subscriptions (e.g., the number of mobile devices associated to the access point).

An inter-AP DS generator 265 in an access point (e.g., access point 1) typically includes, but is not limited to including nor required to include, a dedicated transceiver (not shown) that facilitates transmitting and receiving signals (e.g., pilot signals in a control channel, or in-band management frames) to and from disparate access points (e.g., access point M), and associated circuitry (not shown) that perform measurements necessary to determine inter-AP distance score. Alternatively or in addition, but not shown, elements of the distance score generator can reside in the network management component, in which case only the transceiver need reside in the access point and wherein the metric data is measured by the access point and sent to the network management console (e.g., network management component 210) for conversion into inter-AP distance scores.

In an active monitoring aspect, DS generator 265 in an access point (e.g., 260$_1$) conveys an in-band probe request (not shown), embodied in a set of management frames, to a disparate access point (e.g., 260$_M$) with a specific service set identifier and receives an in-band probe response (not shown) there from. In wireless communication technologies such as LTE, UMB, 802.16 which rely on data and control physical channels for communication, DS generator 265 in, for example, access point 1 can convey a pilot sequence to access point M 260$_M$, which can respond with a (downlink) $CQI^{(INTER)}$ index, e.g., a channel quality indicator that measures channel quality for signals among access points, comprising T bits (T a positive integer).

In a passive monitoring aspect, each access point in the set of access points 260$_1$-260$_M$ scans, via a transceiver and circuitry in inter-AP DS generator 265, or in substantially any other component in the access point, channels available for communication and receives beacon frames and other traffic conveyed from disparate access points.

In either the passive mode or active monitoring aspects, the received signals are exploited by inter-AP DS generator 265 and, at least partially, by processing unit 238 to determine a set of inter-AP DS values. Processing unit 238 can select the lowest inter-AP DS value for each channel that is available for communication, and convey the resulting list of channels versus inter-AP DS to the network management component 210 as a set of values $\{DS_C\}_A$, where C indicates a communication channel and A indicates the AP that conveys the list. Values of $DS_C$ in $\{DS\}_{1-M}$ 215 and algorithms for access point distance determination can reside in memory 245.

In network management component 210, a scan data generator 225 collects the received {DS} values and generates a set of scan data indicators, e.g., a binary sequence that indicates a set of channels utilizes in the vicinity of an access point, for each access point in the set 260$_1$-260$_M$. The scan data generator 225 generates a SDI for each access point by examining the list of distance scores received from the access point, assigning a binary "1" to each channel with distance scores below a predetermined threshold—it is to be noted that those channels are assumed to be supported by disparate access points adjacent to the subject access point. A binary value of "0" is assigned for those channels with distance scores that are above the predetermined threshold; in this scenario, it is assumed that that high distance scores indicate substantial distance between the subject access point and neighboring access points that support those channels, reducing the likelihood of the neighboring APs being adjacent. The binary sequence generation conducted by scan data generator 225 as described above is repeated for each access point to generate disparate scan data indicators for each access point. The following are illustrations of three binary sequences that define three scan data indicators: $\{1_1, 1_2, 0_3, 1_4, \ldots, 0_J, \ldots, 1_{K-1}, 0_K\}$, $\{1_1, 1_2, 0_3, 1_4, \ldots, 0_J \ldots, 1_{K-1}, 1_K\}$, and $\{1_1, 1_2, 0_3, 1_4, \ldots, 0_J, \ldots, 1_{K-1}, 0_K\}$, where a set of K channels is assumed to be employed in the wireless environment. In an aspect, scan data indicators, like the foregoing example SDIs can be conveyed in a K-bit number to the access terminal (e.g., AT 270) that is to proceed to scan a set of frequency resources as a part of a roaming mechanism (e.g., in response to a request to scan in a preventive roaming algorithm). It should be appreciated that to prevent adding traffic to the wireless network (e.g., system 100) in which the subject generation of dynamic Boolean mask occurs, access points can convey scan data indicators within (i) beacon (e.g., a channel-beacon) or probe response frames, or alternatively in a dedicated set of management frames, as an example in the case of a Wi-Fi system based on 802.11 or 802.16; or (ii) in the case of a cellular network, the scan data indicators can be communicated in an extant or, alternatively, in a dedicated control channel; e.g., a scan control channel (SCADCH).

It should be appreciated that a subset of access points in the set of M APs 260$_1$-260$_M$ can employ multiple transceivers for communication exploiting multiple standards (e.g., 802.11, or 802.11b/g)—in such a scenario, each transceiver in such APs can have a specific distance score and scan data indicator A generated set of scan data indicators 235 are communicated to access point(s) 260. It should be appreciated that scan data indicators in the set 255 map the channels in use in the spatial area near an access point.

FIG. 2B illustrates an addition, or alternative, embodiment to example system 200. In illustrative system 280, generation of scan data indicators does not hinge on a centralized entity (e.g., network management component 210); instead, a scan data generator 225 resides on each access point in the set of M access points 260$_1$-260$_M$. It is noted that scan data generator 225 residing in an access point possesses substantially the same functionality as in the scenario that contemplates generating scan data indicators in a network management component 210.

In an aspect, measurements performed (for example by DS generator 265) for distance score determination and the resulting determination of scan data indicators can be (i) a one-time occurrence during network setup, (ii) an occurrence at regular time intervals to adjust to unplanned changes in the wireless environment, (iii) an occurrence prompted by an operator, or (iv) an occurrence triggered by change(s) in a key component of the infrastructure (e.g., addition of APs, adjustment to access-point power-levels, or change in access-point channel assignment, . . . ).

Once a set of scan data indicators 255 is received or generated by access point(s) 260, it can be relayed to an access terminal 270. The terminal 270 utilizes such scan data indicators 255 to compute a set of scan groups via Boolean algebra through a scan group generator component 275. A processing unit 278 can perform at least a portion of the computations conducted by scan group generator 275. Generated scan groups and algorithms associated with the generation of such scan groups can be stored in memory 283. Access terminal 270 also comprises a scanner 285 that gathers computed, or stored, scan groups and performs a frequency scan in the wireless medium where communication takes place as dictated by the scan group. Details of scan group generation are discussed below.

Figure 3:
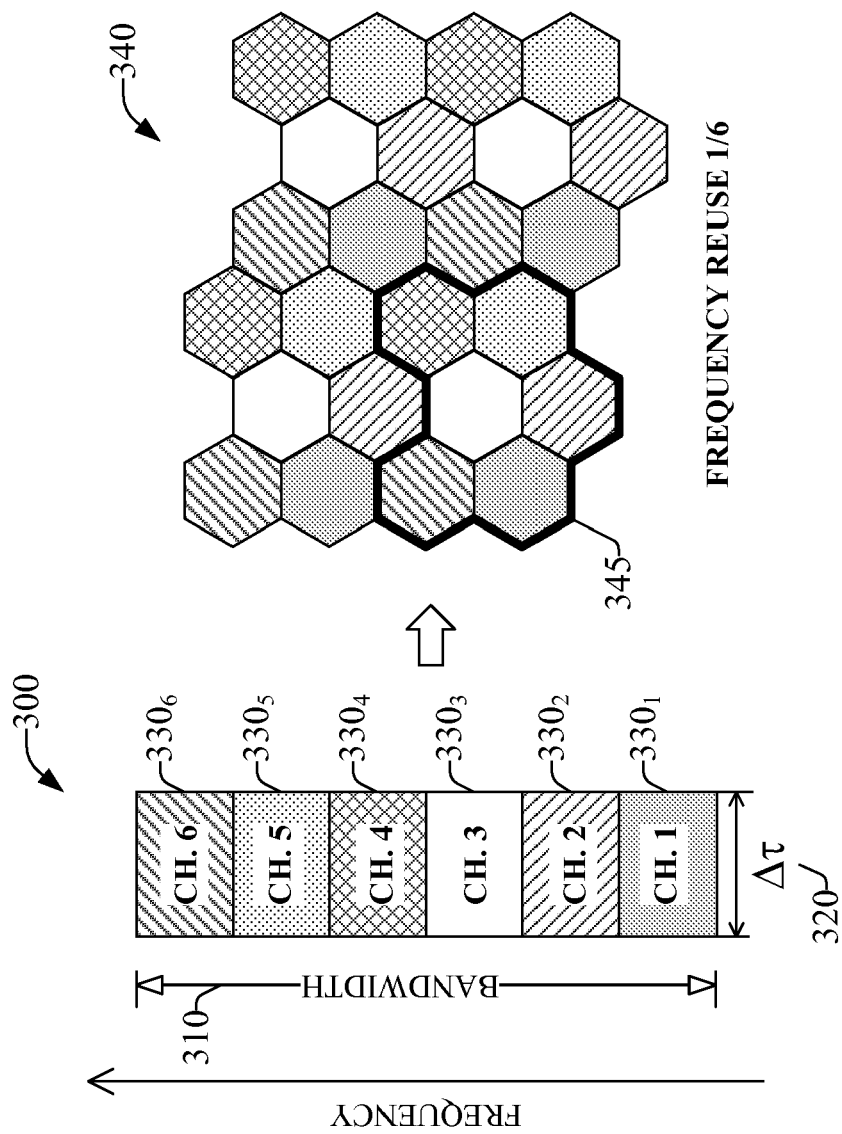
FIG. 3 illustrates diagrams of an example partition of a wireless system bandwidth and associated frequency reuse in accordance with aspects disclosed in the subject specification.

FIG. 3 illustrates diagrams 300 and 350 of an example partition of a wireless system bandwidth and an example associated frequency reuse, respectively, in accordance with aspects disclosed in the subject specification. System bandwidth 310 is partitioned in six channels (or subbands) $330_1$-$330_6$, which typically comprise multiple subcarriers, while the channels are illustrated as spectrally non-overlapping (e.g., a scenario that can be encountered in LTE or 802.11a systems that exploit OFDM) it should be appreciated that depending on the wireless communication system channels can partially overlap (e.g., channel 1 and 2 in 802.11). In an aspect, a wireless system (e.g., system 100) can retain a bandwidth partition 300 for a definite period of time $\Delta\tau$ 310, after which the channel partition can be reconfigured. Several reasons can lead to reconfiguration; for instance, addition of APs to a floor plan, changes in channel quality indices associated with specific locations or APs in a service area, reconfiguration of the floor plan (e.g., addition of new cubicles in a shared office space, changes to furniture in a facility providing wireless access such as Wi-Fi, and so on.

Once a channel partition is determined (e.g., partition 300), an associated frequency reuse configuration 340 can be utilized in order to provide coverage to a floor plan or geographic areas: Each coverage cell can be assigned a specific channel for wireless communication, thus for a determined number of channels, a coverage unit cell 345 can be established and used to cover a determined coverage area. It should be appreciated that an idealized triangular lattice is illustrated in 340. Frequency reuse can afford inter-cell, or other sector, interference reduction as wireless devices operating in disparate service cells communicate in disparate spectral regions. It is to be noted that cells can utilize fewer channels than the number of channels in which bandwidth is partitioned; for instance, typically a 802.11b/g system exploits channels 1, 6, and 11 for frequency reuse, rather than the full set of 11 channels, in order to ensure lower levels of inter-cell interference as channels 1, 6, and 11 are spectrally non-overlapping. Utilization of a subset of channels (e.g., channels $330_1$-$330_6$) can also facilitate roaming.

Figure 4:
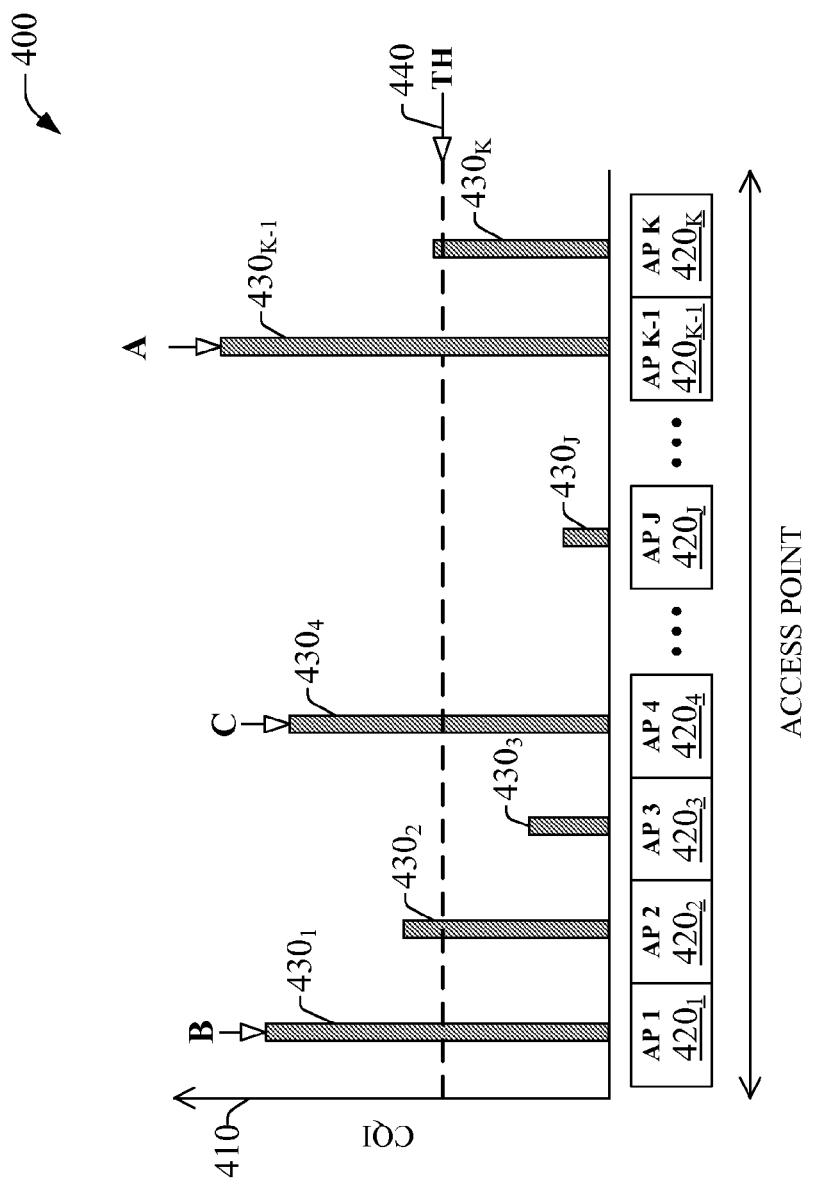
FIG. 4 illustrates selection of access points near a mobile device that the mobile can utilize to establish a set of scan groups or Boolean channel masks according to aspects described herein.

FIG. 4 illustrate selection of access points that facilitate determination of scan groups or Boolean channel masks to be utilized for frequency scanning in preparation for roaming. In particular, FIG. 4 illustrates an example chart 400 of a set of CQI (channel quality indicators) 420 of a set of access points $420_1$-$420_K$ as measured by an access terminal (e.g., terminal 270) that prepares for roaming. It is to be noted that scan group generator 275, assisted at least in part by processing unit 278, can conduct measurements necessary for CQI determination. As mentioned above, a channel quality metric generally is measured channel signal strength, signal delay, signal-to-noise ratio (SNR), channel subscription level, signal-to-interference-and-noise ratio (SINR), wherein interference can be other cell/sector interference (OSI), intracell or co-channel interference, a ratio of received and lost beacons, and so on. For each access point $410_G$ (G=1, 2, ..., K−1, K) a CQI 420G is determined. It should be appreciated that variations in CQI can reflect variations in signal strength that arise at least from variations in (a) the spatial distance relative to a specific access point for which the channel quality is probed, and (b) variations in scattering and absorption of transmitted signal. It is to be noted that (a) and (b) are dynamic quantities, and their time dependence can be reflected in a CQI chart 400 when signal quality is evaluated in a determined time span.

Thus, diagram 400 can be regarded as a snapshot for a specific time or as an average (e.g., a rolling average), which can smooth out non-systematic fluctuations in signal strength. From CQI diagram 400, access points with the stronger signals can be determined. It should be appreciated that through a known frequency reuse plan, the access points associated with the strongest signal can be mapped in a floor map or a coverage area. It is to be noted that regardless of the geometry configuration of access points $410_1$-$410_K$ in a floor plan, selection (typically conducted by scan group generator 275, through processing unit 278) of at most three access points with the strongest channel quality (e.g., A, B, and C) is sufficient to generate Boolean channel masks as described hereinafter. If there are fewer than three access points in the infrastructure, or fewer than three with the signal quality necessary to place them above a certain threshold TH 440, the algorithm will proceed to generate masks with data from less than three access points. It should be appreciated that discarding access points with signals below a threshold, like signals from access points $420_3$ and $430_J$, prevents the mobile devices from wasting radio time and battery power on scans unlikely to yield positive results.

Figure 5:
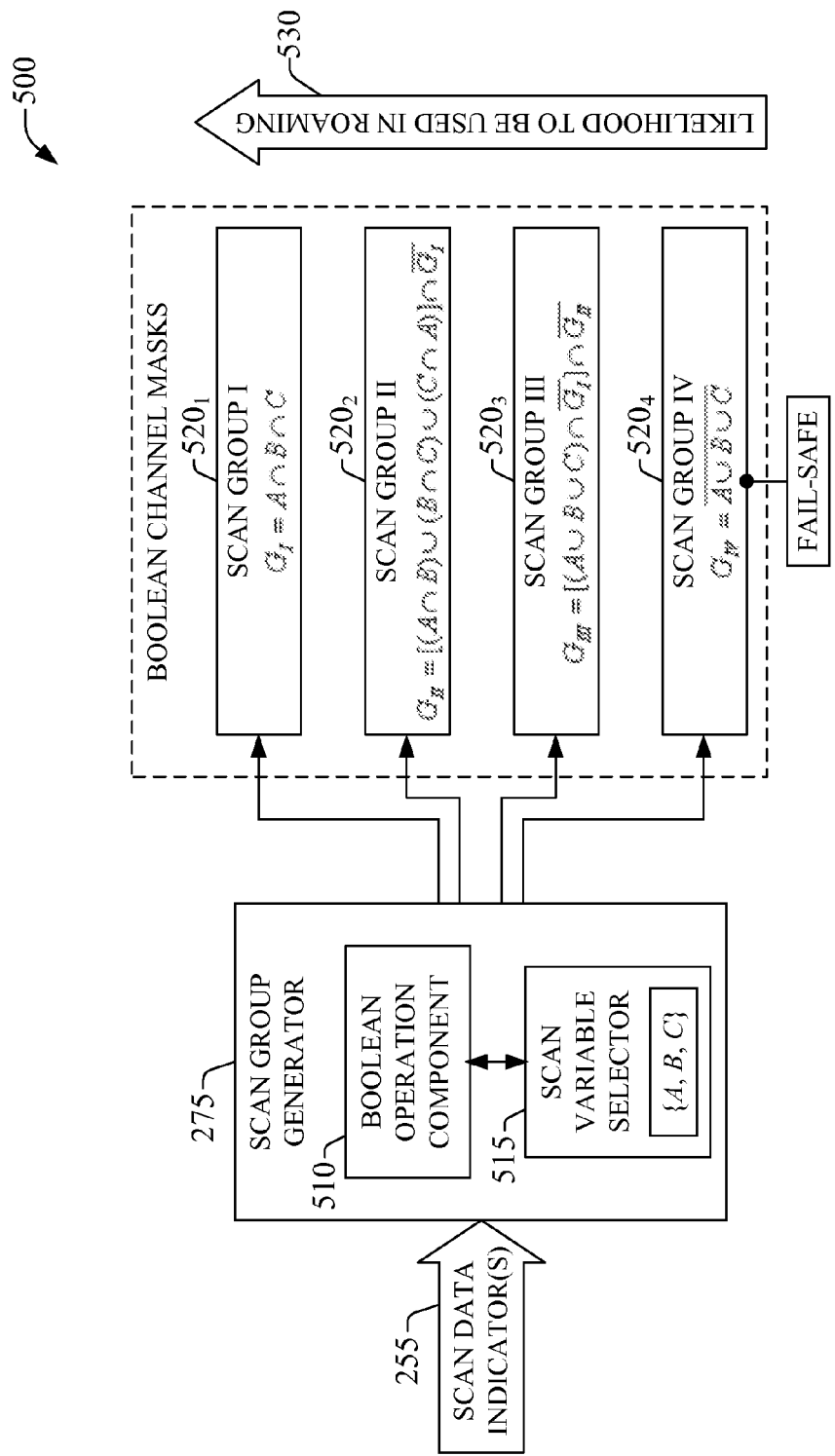
FIG. 5 is a block diagram that illustrates the generation of dynamic Boolean channel masks through Boolean operation(s) on a set of scan data indicators according to aspects described herein.

FIG. 5 is a block diagram that illustrates generation of dynamic Boolean channel masks and the Boolean operation(s) that result in the masks. As discussed above in connection with FIG. 2, a set of scan data indicators 255 is conveyed to scan group generator 275. The analogy between a lattice in signal-space and position-space combined with frequency reuse and the notion that any two-dimensional lattice can be triangulated leads to selecting three scan variables A, B, and C, via a scan variable selector 515: The channel signal strength of received signal carrying scan data indicators 255 (e.g., a control physical channel in a cellular system like LTE or UMB, or signal strength of beacon management frames in case of 802.11b/g technologies) is measured, and up to three scan data indicators associated with the up to three strongest signals are received and assigned to scan variables A, B, and C. It should be appreciated that a scan variable has the same structure as a scan indicator; e.g., a binary sequence of a specific length. The three scan variables A, B, and C, can be employed to generate three fundamental scan groups $G_I$ $520_1$, $G_{II}$ $520_2$, $G_{III}$ $520_3$ and an associated fail-safe group $G_{IV}$ $520_4$ that can be utilized for roaming with a likelihood that decreases with increasing cardinality. The first three fundamental groups account for the channel structure (which in position space would be the actual lattice structure) of the conventional triangular lattice 440 derived from the three strongest channels A (e.g., $420_{K-1}$), B (e.g., $420_1$), and C (e.g., $420_4$). Fourth group $G_{IV}$ $520_4$ is the set of channel that is the complement to the channel in the union of groups $G_I$ $520_1$, $G_{II}$ $520_2$, $G_{III}$ $520_3$ and as such is a fail-safe group which contains all remaining channels not reported in scan data indicators {A}, {B}, and {C} but are included in the wireless communication technology employed by a wireless system that exploit dynamic Boolean channel masks. Fail-safe group $G_{IV}$ $520_4$ can be useful when a scanning terminal is found in one or more of the following scenarios. (i) The wireless infrastructure (e.g., access point(s) 260) is misconfigured, which can result in inaccurate scan data indicators being conveyed. (ii) The wireless infrastructure (e.g., network management component 210) has performed an automatic channel reconfiguration and has rendered invalid a set of channel scan data indicator(s) on the terminal. (iii) Scan data indicator(s), or scan variables, utilized to build channel scan groups fails to be appropriate for a specific coverage area (e.g., CQI is the result of a temporary signal bounce). (iv) Wireless network suffers from design flaws—e.g., poorly designed frequency partitioning and reuse, with the ensuing co-channel interference; poor coverage and other sector interference due to lack of adequate power control; external interference; or over subscription.

Given a set of scan indicators {A}, {B}, and {C} with corresponding variables A, B, and C, the Boolean algebra operations the lead to scan groups $G_I$ 520$_1$, $G_{II}$ 520$_2$, and $G_{III}$ 520$_3$ are the following:

$$G_I = A \cap B \cap C, \quad (1)$$

$$G_{II} = [(A \cap B) \cup (B \cap C) \cup (C \cap A)] \cap \overline{G_I}, \quad (2)$$

$$G_{III} = [(A \cup B \cup C) \cap \overline{G_I}] \cap \overline{G_{II}}. \quad (3)$$

As mentioned above, the fourth, fail-safe group is $$G_{IV} = \overline{A \cup B \cup C}. \quad (4)$$

In an aspect, Boolean operation(s) in Eqs. (1)-(4) can be conducted by a Boolean operation component 510 that can reside within a scan group generator 275. It is to be appreciated Boolean operations [Eqs. (1)-(4)] typically are included within the set of fundamental mathematical operations performed by substantially all processors (e.g., processor 235). Accordingly, such operations can be regarded as more fundamental to processor operation/execution than algebra operations like addition or subtraction. Accordingly, execution of Boolean operations [Eqs. (1)-(4)] in a mobile terminal (e.g., access terminal 270) can demand minimal storage, processor runtime, and battery power resources.

Scan groups 520$_1$-520$_4$ are termed dynamic Boolean channel masks as the groups "mask out" (set to zero entries in a scan indicator) channels that are not to be scanned. It should be appreciated that, in an aspect, scanner 285 can receive groups $G_I$ 520$_1$, $G_{II}$ 520$_2$, $G_{III}$ 520$_3$ and $G_{IV}$ 520$_4$ (e.g., receive channel mask in an N-bit word format) and utilize such groups to restrict channel scans to channels indicated by the dynamic Boolean masks 520$_1$-520$_4$. It should be appreciated that it is only after using all four scan groups in sequence that a mobile has used the same radio time and battery resources as in the case of a full-channel scan.

Next, determination of scan groups as discussed supra is illustrated in an example network system that relies on a bandwidth partition of 11 channels, with a full frequency reuse of 1/11. It should be appreciated that while such a large channel reuse is typically infrequent in an actual implementation, it facilitates discussion of the principles presented above in connection with FIGS. 3-5.

Figure 6A:
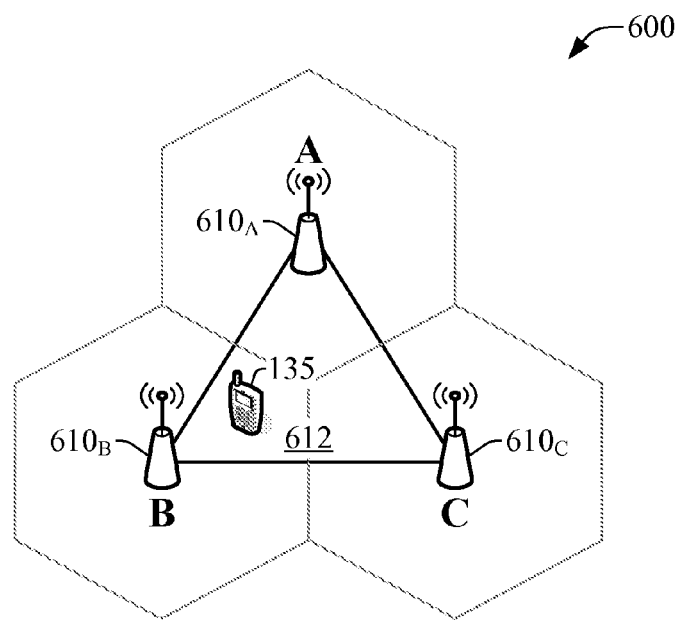
FIGS. 6A, 6B, and 6C are diagrams of portions of an example wireless system that facilitate illustrating how channel masks in effect map to a network topology.
Figure 6B:
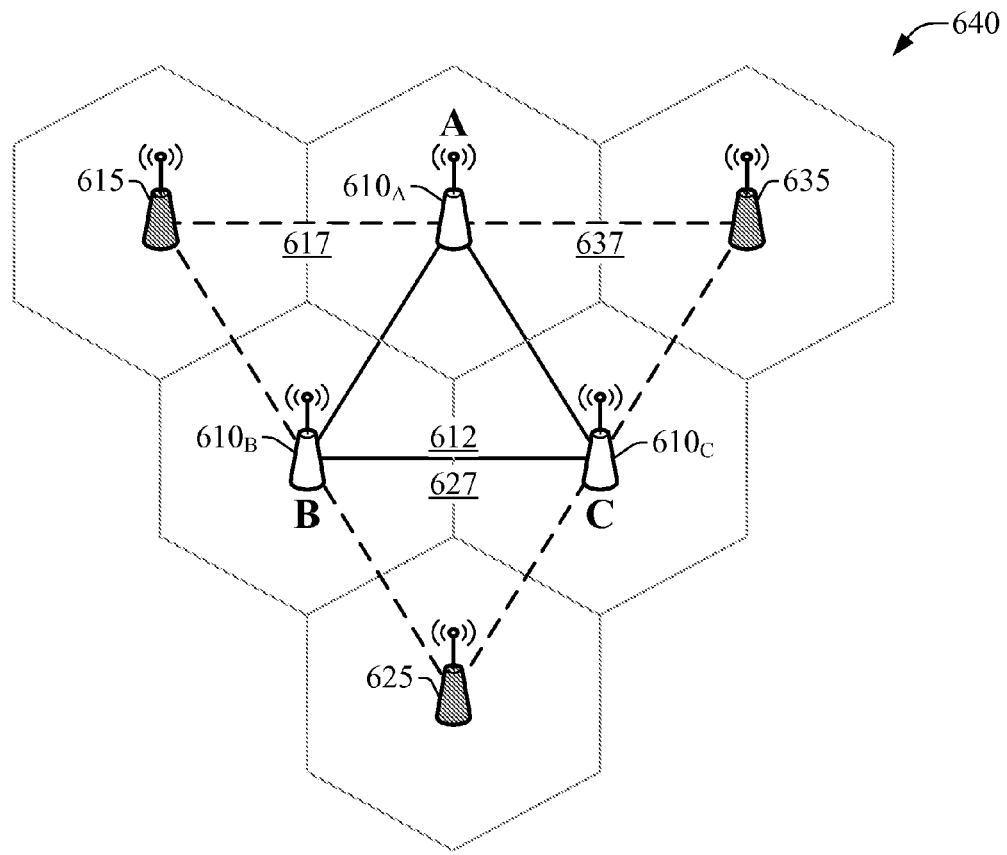
Figure 6C:
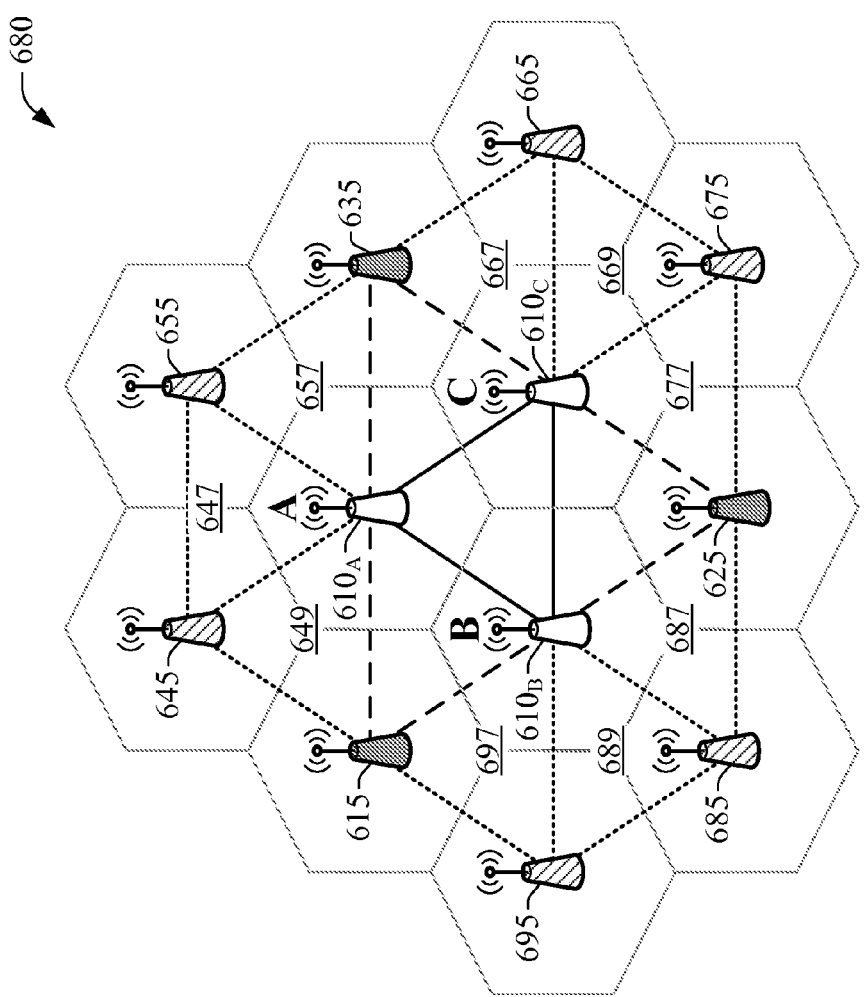

FIGS. 6A, 6B, and 6C are diagrams 600, 640, and 680, respectively, of portions of an example wireless system that facilitate illustrating selection of channel scan groups. With respect to FIG. 6A, a terminal 135 is located in the conventional triangular unit cell 612 spanned by base stations 610$_A$, 610$_B$, and 610$_C$. Due to the proximity of such base stations to terminal 135, the signal strength of a communication between terminal 135 and either of these APs can be substantially the highest among access points in the system (see FIG. 4). Accordingly, such APs can provide substantially the highest connectivity for communication in the channels employed by these base stations. A first scan group can then result from the intersection of the scan data indicators assigned to and transmitted from access points A, B, and C. Thus, the first group can be $G_I$, and the equation that defines it become readily apparent.

In an aspect, if a wireless system utilizes 802.11b/g technology for communication, scanning the first group of three channels associated with 610A, 610B, and 610C, instead of the 11 channels available for such technology, affords a 72% reduction in scanning time per scan instance. Thus, savings in battery consumption and reduction in latency intervals can be substantial.

It should be appreciated that terminal 135 can roam within the conventional unit cell 612 and thus the first scan group (e.g., group $G_I$) can suffice to retain a communication. In addition, for wireless environments that employ three channels, such first group is substantially the only scan group that can be computed (Eq. (1)) and utilized during roaming. Alternatively, terminal 135 can exit cell 612 and enter one of cells 617, 627, or 637, as illustrated in FIG. 6B. Thus, in the unlikely event the channels used by A, B, and C are not reused in these areas, a second scan can be necessary. To determine such a second group, it is observed that channels associated with APs 615, 625, and 635 ought to be scanned as the roaming area is expanded. It should be appreciated that as terminal 135 that exits unit cell 612 can cross one of sides AB, BC, CA, therefore the channels to be scanned are those channels that do not belong to group $G_I$ (e.g., its complement) and that account for crossing each of the sides of the unit cell 612, e.g., the union of each possible pairwise intersection among A, B, and C, provided that the channels already scanned as part of group $G_I$ be excluded. Thus, group $G_{III}$ and the Boolean operation (Eq. (2)) that determines it become readily apparent.

It should be noted that if scan group $G_I$ includes three channels and the second scan group $G_{III}$ contains three additional channels, an access terminal 135 in a wireless environment that operates with 802.11b/g technology can realize a 45% savings in scan time and associated battery performance even if the mobile device has to resort to the second channel mask, or scan group as the result of poor results returned from scanning the first channel group.

As terminal 135 roams further away from cells 612, 617, 627, and 637, it can enter nine disparate unit cells: 647, 649, 657, 667, 669, 677, 687, 689, 697. A third scan group would comprise the channels associated with the additional access points that facilitate defining the nine disparate cells indicated above; namely, 645, 655, 665, 675, 685, and 695. It is noted that such channels can be determined through a Boolean computation: Channels in the third scan group would not comprise channels in $G_I$ or channels in $G_{II}$. In addition, only cells 647, 689, and 669 can be reached directly by roaming from cell 612 through vertices 610$_A$, 610$_B$, and 610$_C$. Thus, the third scan group can be determined through the intersection between the union among A, B, and C (which describes direct passage into cells 647, 689, and 669) and the complement of $G_I$, and the intersection of the resulting set with the complement of $G_{II}$. Thus, Eq. (3) is the Boolean expression that express the third scan group $G_{III}$.

Figure 7:
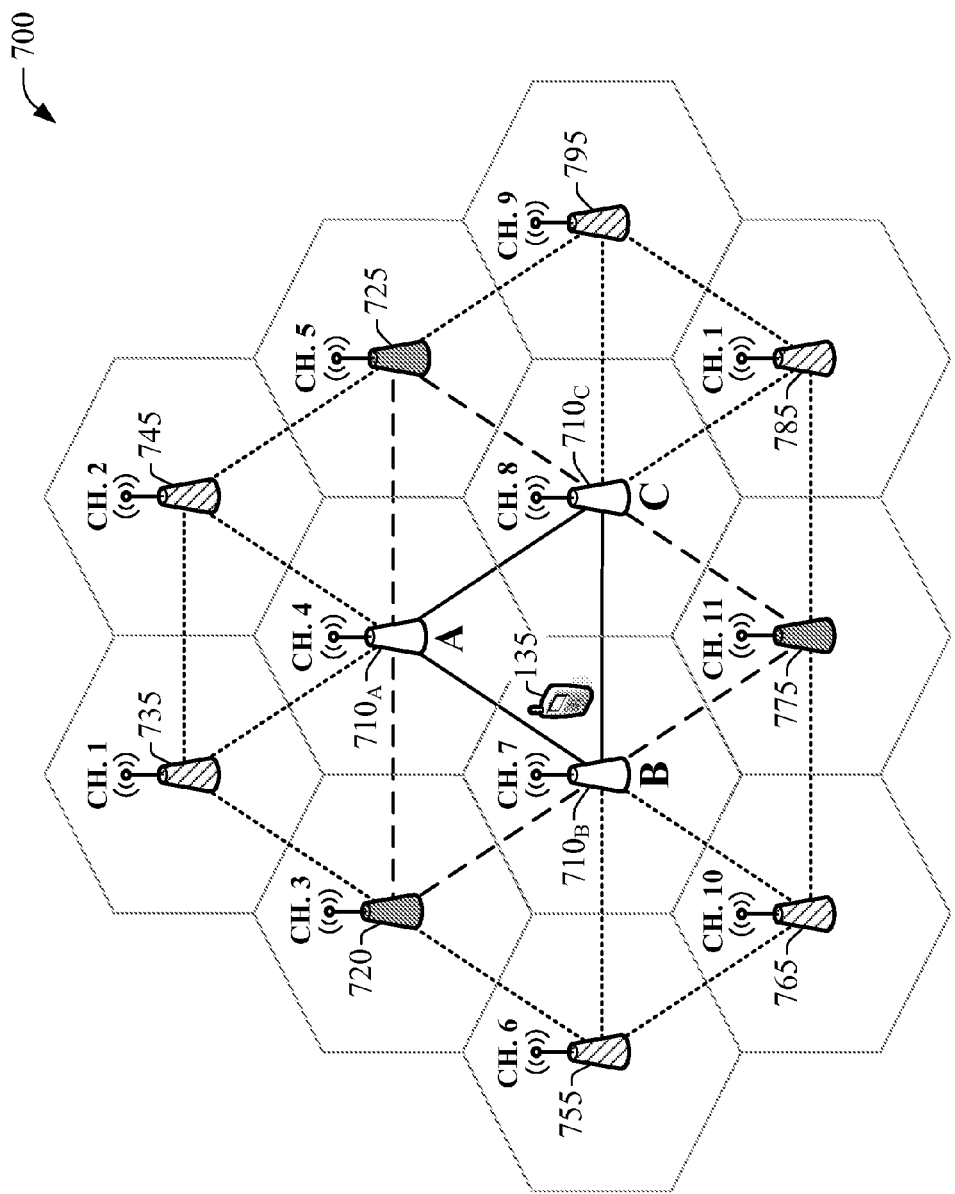
FIG. 7 is a diagram of an example wireless system that facilitates illustrating Boolean operations that result in Boolean channel masks in accordance with aspects described herein.

FIG. 7 is a diagram of an example wireless system 700 that can exploit dynamic Boolean channel masks for efficient channel scanning, and facilitates illustrating the application of Boolean operations [Eq. (1)-(4)] that least to Boolean channel masks. The system incorporates 11 channels (e.g., the 11 channels in 802.11b/g), even though it should be appreciated the Boolean channel masks algorithm will work in environments that include 12 or more channels. As utilized above, an idealized triangular lattice represents the service coverage. It should be appreciated that the analogy between location in signal space and position space is also exploited in diagram 700. Terminal 135 resides in the coverage conventional cell spanned by APs A 710$_A$, B 710$_B$, and C 710$_C$. Such access points possess the strongest signal and thus associated scan data indicators, e. {A}, {B}, and {C}, are to be determined in order to compute a set of dynamic Boolean channel masks. In example network 700, APs 710$_B$, 710$_C$, 720, 725, 735, 745 which neighbor AP A $710_A$ utilize, respectively, channels 7, 8, 3, 5, 1, and 2. Therefore, as discussed above (FIG. 4), AP A conveys a scan data indicator {A} $750_A$ that lists such channels in addition to its own communication channel, which is channel 4. Similarly, channels to be broadcasted by AP $710_B$ comprise channels 3, 4, 6, 7, 8, 10, and 11, which are associated respectively with APs 720, $710_A$, 755, $710_B$, $710_C$, 765, and 775. Moreover, for AP $710_C$, channels to be broadcasted are 1, 4, 5, 7, 8, 9, 11. Such a topology leads to the following 11-bit scan data indicators: {A}={1,1,1,1,1,0,1,1,0,0,0}, {B}={0,0,1,1,0,1,1,1,0,1,1}, and {C}={1,0,0,1,1,0,1,1,1,0,1}. It should be appreciated that channel 1 has been adopted as the channel of AP 785. With such values for scan data indicators, group $G_I$ can be determined according to Eq. (1): $G_I$={0,0,0,1,0,0,1,1,0,0,0}. It should be appreciated that $G_I$ is the scan group that contains only the nearest neighboring channels to terminal 135, as discussed above in connection with FIG. 6A. Application of Boolean operations in Eqs. (2) and (3) result in $G_{II}$={0,0,1,0,1,0,0,0,0,0,1} and $G_{III}$={1,1,0,0,0,1,0,0,1,1,0}. It is to be noted that in example system 700, $G_{IV}$ is the empty set because all the channels covered by the standard employed for the example network 700 were in use in the exhaustive example network 700. It should be appreciated this exhaustive example was chosen to illustrate how the algorithm is applicable to even extreme network topologies.

In view of the example systems and associated aspects presented and described above, methodologies for generating dynamic Boolean channel masks that may be implemented in accordance with the disclosed subject matter can be better appreciated with reference to the flowcharts of FIGS. 8, 9, 10, 11, and 12. While, for purposes of simplicity of explanation, the methodologies are shown and described as a series of blocks, it is to be understood and appreciated that the claimed subject matter is not limited by the number or order of blocks, as some blocks may occur in different orders or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). It should be further appreciated that the methodologies disclosed hereinafter and throughout the subject specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figures 8, 9:
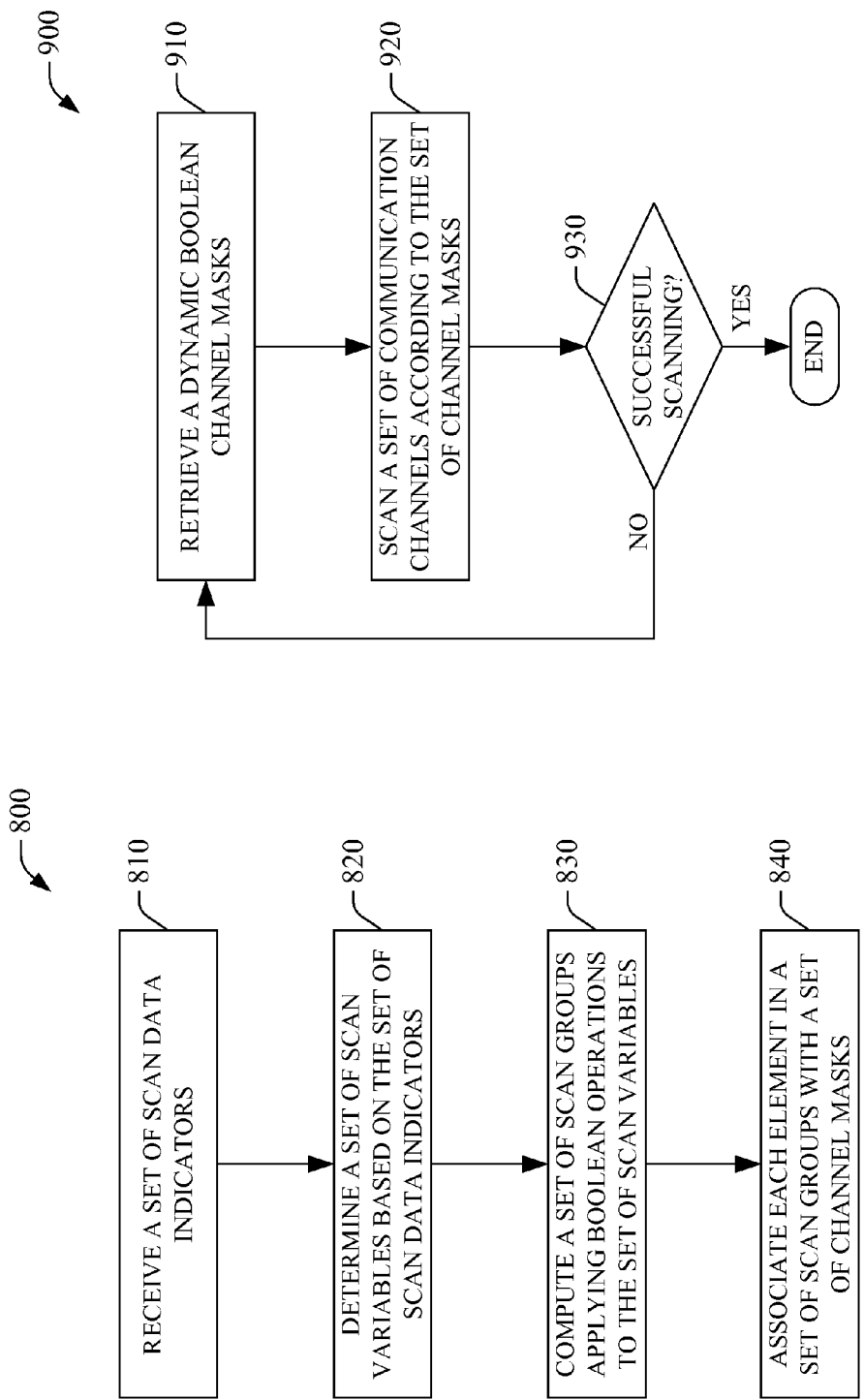
FIG. 8 presents a flowchart of an example method to establish a set of dynamic Boolean channel masks in accordance with aspects set forth herein.
FIG. 9 presents a flowchart of an example method of scanning a set of communication channels according to aspects disclosed herein.

FIG. 8 presents a flowchart of an example method 800 to establish a set of dynamic Boolean channel masks. At act 810 a set of scan data indicators is received. In an aspect, scan data indicators are a multi-bit word wherein each bit is associated with a channel utilized in a deployed technology that facilitates wireless communication. In an aspect a "1" bit can indicate a channel that can carries a an appreciable signal and can provide communication with a reference wireless terminal, whereas a "0" bit indicates a weak or not utilized channel that fails to sustain a data, or alternatively control, communication with the terminal. It should be noted that the number of word length is determined by an actual number of channels employed in communication rather than the maximum affordable channels in the technology. For example, in an 802.11b/g wireless environment in the United States of America, a scan data indicator can comprise up to 11 bits, whereas in a 802.16 environment a significantly larger number of channels can be utilized depending on the number of terminals that are served by a base station.

At act 820 a set of scan variables are determined based on the received set of scan data indicators. In an aspect, determination consists in initialization of variable A, B, and C that enter a Boolean computation that determines a set of scan groups. At act 830 a set of scan groups is computed applying Boolean operations to the set of scan variables. The Boolean operation are those in Eq. (1)-(4) described in connection with FIG. 5 above. At act 840 each element in a set of scan groups (e.g., $G_I$, $G_{II}$, $G_{III}$, and $G_{IV}$) is associated with a set of channel masks. It should be appreciated that once a set of scan groups is determined the set is generic and represents an indication of channels to be scanned in order to ensure retention of a communication through roaming. Therefore, a set of channel masks can be utilized by disparate devices within a service cell. It is to be appreciated that the set of scan groups can change dynamically through changes in the received scan data indicators. The channel masks are dynamic Boolean channel masks and can be employed in various methods executed by multiple devices.

FIG. 9 presents a flowchart of an example method 900 for scanning a set of communication channels. At act 910 a dynamic Boolean channel mask is retrieved. The Boolean channel mask facilitates reducing scanning time and thus can afford an increased performance and quality of service for a wireless device that utilizes such masks. In an aspect, a dynamic Boolean channel mask can be retrieved from a memory (e.g., memory 242) by a scanner component (e.g., scanner 285) in response to a request (not shown) from a disparate method (e.g., a preventive roaming algorithm). In an aspect, a component that generates the mask can stores the mask(s) in the memory; for example, such a generation component can be a scan group generator (e.g., generator 275) that exploits method 800. At act 920, a set of communication channels is scanned according the retrieved dynamic Boolean channel mask. Act 930 is a validation act that probes whether the scanning was accomplished successfully, wherein a successful scan is defined as a scan resulting in the detection of one or more access points with sufficiently high signal quality to make it an adequate roaming destination for the mobile device. A negative response returns the logic flow to act 910, whereas an affirmative outcome to validation act 930 ends the logic flow.

FIG. 10 presents a flowchart of an example method 1000 for generating a set of scan data indicators. At act 1010 a set of access point distance scores $\{DS_C\}_A$ is determined by an autonomous access point or an access point working in conjunction with another wireless network management component (e.g., a network switch). Alternatively, or in addition, the set of distance scores can be received by the network management component. At act 1020 a set of scan data indicators is generated after filtering out redundant channels and grouping adjacent access points and thus the channels they service. In an aspect, a scan data generator (e.g., generator 275) facilitates generating a set of scan data indicators by utilizing the set of received $\{DS_C\}_A$ associated with a set of access points (e.g., APs $260_1$-$260_M$). Generation can proceed in substantially the same manner as described in connection with FIG. 2A. It is to be noted that acts 1010 and 1020 can be performed exclusively (e.g., only one of the acts is performed) or inclusively (e.g., both acts are performed as part of method 1000). In an aspect, a scenario that can result in inclusive performance of both subject acts is when a portion of APs in a network are not configured or capable to generate SDIs.

At act 1030 the generated set of scan data indicators is stored. In an aspect, scan data indicators can be stored in a memory (e.g., memory 235) coupled to the scan generator component that generates such indicators. Storage can facilitate scheduling management is a component wherein the scan data indicators are generated. In addition, scan data indicators can be stored in a web server that is part of a subnetwork linked to the component (e.g., network management component 210) that hosts the scan data generator component (e.g., component 225). Stored scan data indicators so stored can be downloaded in order to initialize a configuration of a terminal that is Boolean channel mask capable. It should be appreciated that scan data indicators associated with various terminals located in disparate in a floor plan can be accumulated for configuration purposes of roaming devices based on historic data.

At act 1040 the set of scan data indicators is conveyed. Scan data indicators (SDIs) are typically conveyed from a network management component to the set of access points associated with a set of communications channels utilized for wireless communication, but in an autonomous access point they are simply conveyed form the scan data generator to the subsystem(s) in the access point responsible for transmitting the scan data indicators. Transmission of SDIs can be accomplished over the air interface or backhaul communication network (e.g., backhaul wired link 165) associated with a wired network architecture (e.g., network 160) which is linked to the wireless system (e.g., system 100). It should be appreciated that acts 1030 and 1040 can be conducted concurrently or in a reversed order.

FIG. 11 presents a flowchart of an example method 1100 for conveying a subset of scan data indicators. At act 1110 a set of scan data indicators is received. In an aspect, such set of scan indicators can be generated by method 1000. It should be appreciated that the set of scan data indicators can be specific to a terminal that can execute systematic scanning of frequency resources in order to ensure retention of a communication (e.g., data packet(s) for voice over IP, on-line gaming, data transfer, and so on) by exploiting roaming. In addition, or alternatively, multiple sets of scan indicators can be received, corresponding to disparate access terminals (e.g., access terminal 270). At act 1120 a subset of the set of scan indicators is relayed. In an aspect, scan data indicators (e.g., indicators $490_A$, $490_B$, and $490_C$) can be communicated in (1) unused beacon or probe response frames in the case of 802.11 or 802.16 based technologies, or (2) an extant control channel or a dedicated physical channel such as scan data channel (SCADCH). In another aspect, the subset of scan data indicators can be relayed to a group of terminals simultaneously, in a multicast manner. Alternatively, the subset can be relayed to a specific terminal, in unicast manner. In yet another aspect, the subset of scan data indicators can be buffered prior to be relayed, such a situation can arise as a result of operational changes in a terminal that is to receive the subset of scan indicator. Buffering can be facilitated by a memory (e.g., memory 245) that resides in an access point (e.g., AP 260) that conveys the scan data indicators.

Figure 12:
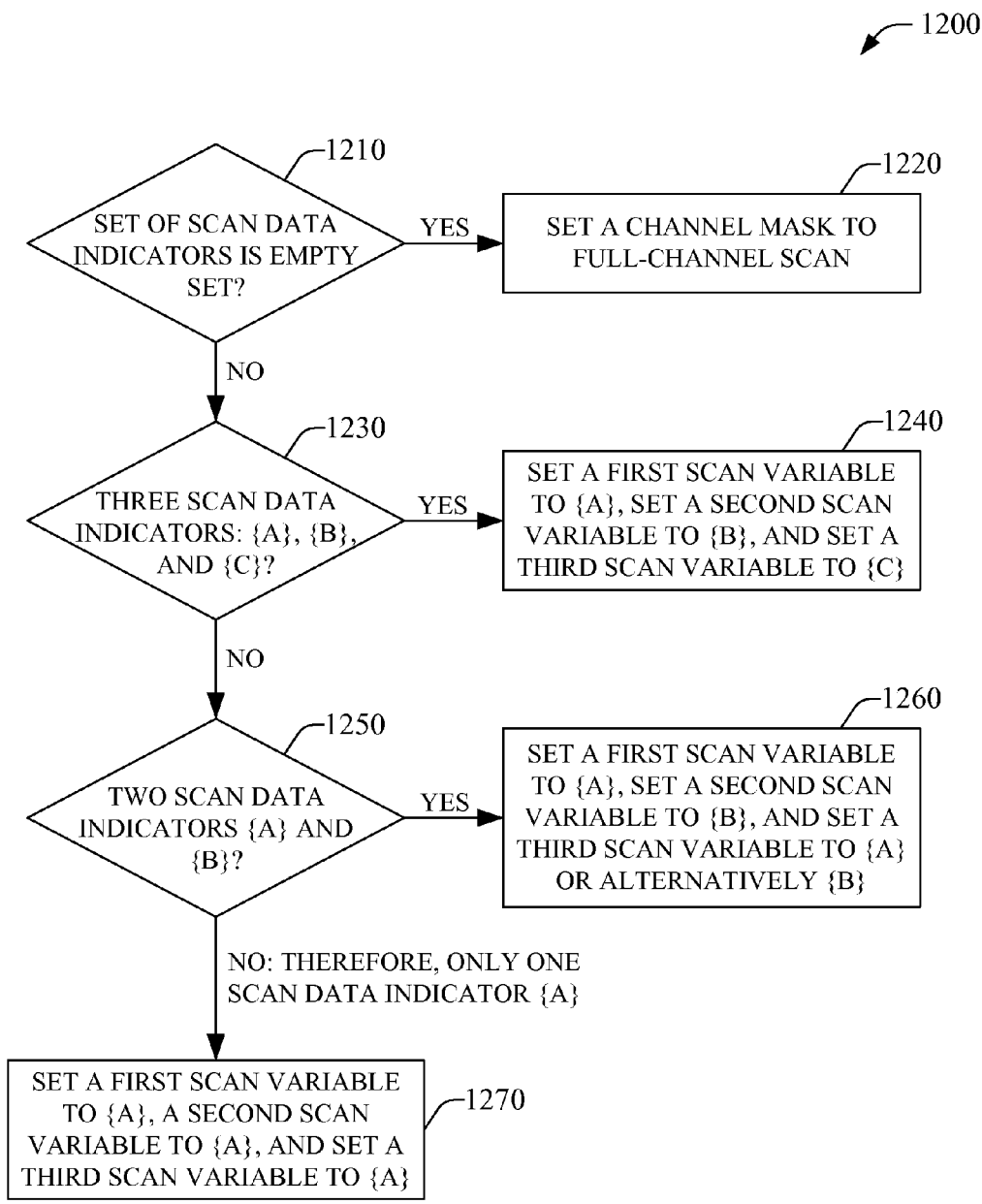
FIG. 12 presents a flowchart of an example method for determination of a set of scan variables that are utilized for a Boolean computation of scan groups according to aspects described in the subject specification.

FIG. 12 presents a flowchart of an example method 1200 for determination of a set of scan variables that are utilized for a Boolean computation of scan groups. Method 1200 can be utilized in act 820 discussed above. At act 1210 a check is conducted to determine whether a received set of threshold filtered scan indicators is empty. A result in the affirmative indicates that there are no desirable APs "visible" in the environment of a terminal that convey scan-data management frames, and flow is directed to act 1220, wherein a default channel mask is retained at full-channel scan value. Such a default value can persist until a non-empty set of scan data indicators is acquired at a later instant. Such a mask can be stored in a memory (e.g., memory 245) in the terminal (e.g., terminal 135, or access terminal 270) that is seeking to associate with an access point (e.g., base station $105_3$, or access point 260) in the coverage (e.g., area $110_3$) area which exhibits a channel quality index above a predetermined threshold.

A negative response to validation act 1210 prompts validation act 1230, wherein the availability of three scan indicators is probed. An affirmative response leads to act 1240 in which three scan variable are set: A first scan variable is set to {A}, a second scan variable is set to {B}, and a third scan variable is set to {C}. The three scan variables can be stored in a memory (e.g., memory 245) in the scanning terminal.

When check 1230 results in less than three available elements in the set of scan data indicators, validation act 1250 probes whether two scan data indicators {A} and {B} are present. An affirmative result leads to act 1260, in which a first scan variable being set to {A} (A={A}) and a second scan variable being set to {B} (B={B}). Additionally, in this case a third scan variable is set as C={A} or to C={B}.

In case of a negative check, there is only one element in the set of scan data and flow is transferred to act 1270 and a first scan data variable is set to {A} ({A}={A}), a second scan data variable is set to {A} ({B}={A}), and a third scan variable is set to {A} ({C}={A}).

Figure 13:
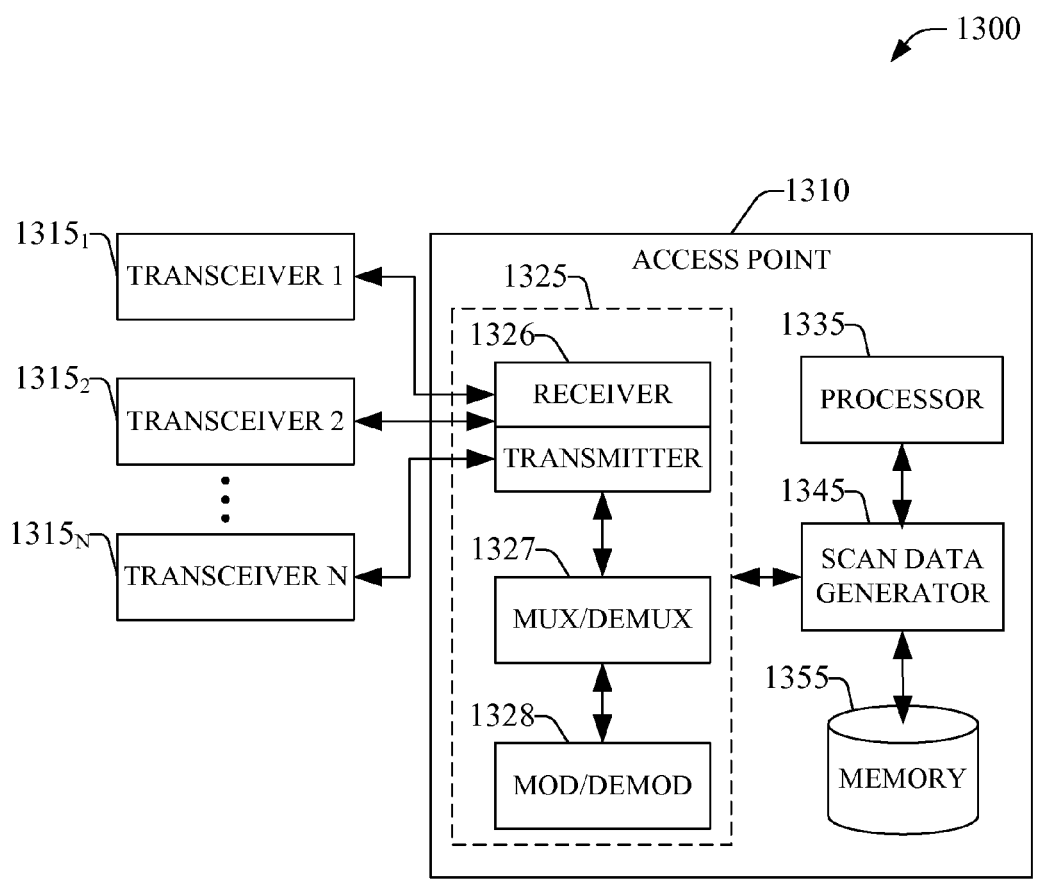
FIG. 13 is a block diagram of an example system that facilitates generation and transmission of scan data indicators in accordance with various aspects described in the subject specification.

FIG. 13 is a block diagram of an example system that facilitates generation and transmission of scan data indicators in accordance with various aspects described in the subject specification. In one example, system 1300 embodies an access point 1310. As illustrated, access point 1310 can receive and transmit signal(s) from and to wireless devices like access points, access terminals, wireless ports and the like through a set of transceivers $1315_1$-$1315_N$. Access point 1310 also includes an operational group 1325 that comprises electronic components and associated circuitry that facilitate processing and manipulation of received signal(s) and signal(s) to be transmitted. In an aspect, group 1325 includes a receiver/transmitter 1326 that can convert signals from analog to digital upon reception and from digital to analog upon transmission. In addition, receiver/transmitter can divide a single data stream into multiple, parallel data stream or perform the reciprocal operation. Coupled to receiver/transmitter 1326 is a multiplexer/demultiplexer 1327 that facilitates manipulation of signal in time and frequency space. Electronic component 1327 can multiplex information (data and control) according to various multiplexing schemes such as OFDM. In addition, mux/demux component 1427 can scramble and spread information (e.g., codes) according to substantially any code known in the art; e.g., Hadamard-Walsh codes, Baker codes, and so on. A modulator/demodulator 1328 is also a part of operational group 1325, and can modulate information according to multiple modulation techniques, such as frequency modulation, amplitude modulation (e.g., M-ary quadrature amplitude modulation (QAM), with M a positive integer), phase-shift keying (PSK), and the like.

Access point 1310 also includes a processor 1335 configured to confer functionality, at least partially, to substantially any electronic component in access point 1410. In particular, processor 1335 can facilitate operation of scan data generator 1345 according to aspects disclosed herein. In addition, processor 1435 can facilitate operations on data (e.g., symbols, bits, or chips) for multiplexing/demultiplexing, such as effecting direct and inverse fast Fourier transforms, selection of modulation rates, selection of data packet formats, etc. A memory 1355 can store data structure, code instructions, system information, look-up tables, code sequences for scrambling, spreading and pilot transmission, floor plan configuration, access point deployment and frequency plans, scheduling policies, and so on. Processor 1434 is coupled to the memory 1355 in order to store and retrieve information necessary for operation of group 1325 and other aspects of access point 1310.

Figure 14:
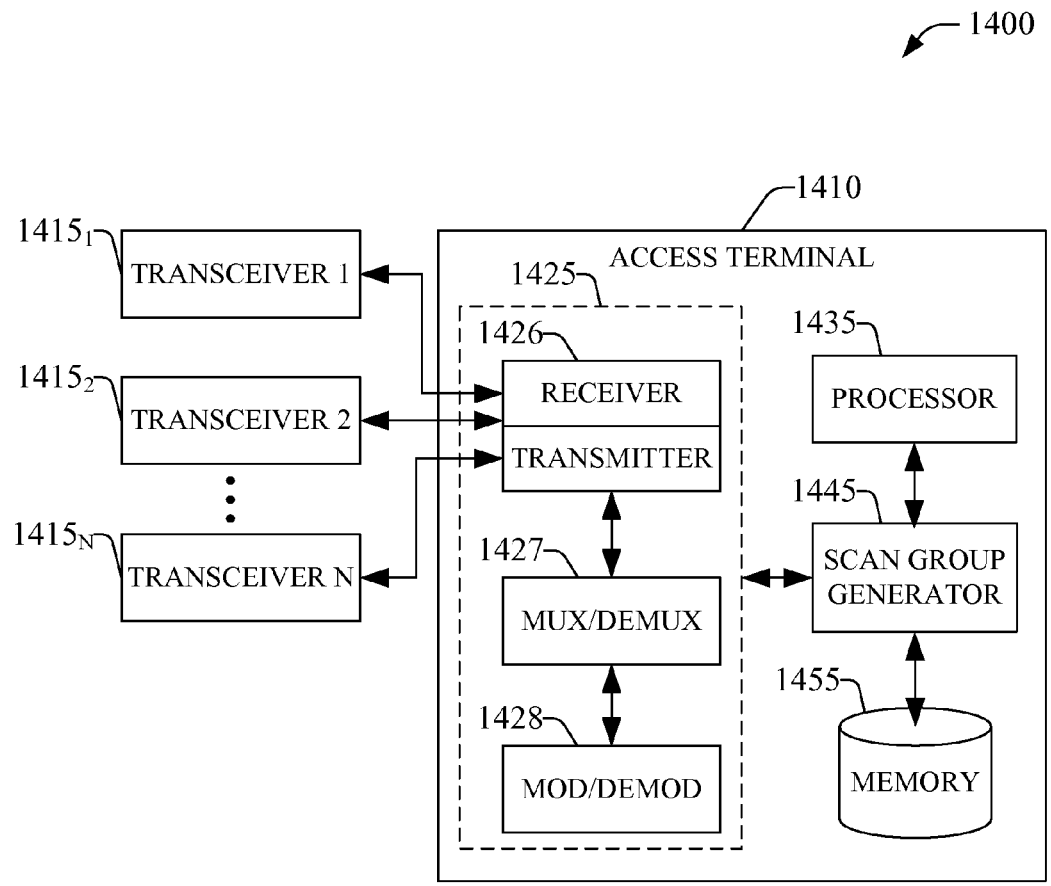
FIG. 14 is a block diagram of an example system that facilitate generation of dynamic Boolean scan groups according to various aspects described herein.

FIG. 14 is a block diagram of an example system that facilitate generation of dynamic Boolean scan groups according to various aspects described herein. In one example, system 1400 embodies an access terminal 1410. As illustrated, access point 1410 can receive and transmit signal(s) from and to wireless devices like access points, access terminals, wireless ports and the like through a set of transceivers $1415_1$-$1415_N$. Access point 1410 also includes an operational group 1425 that comprises electronic components and associated circuitry that facilitate processing and manipulation of received signal(s) and signal(s) to be transmitted. In an aspect, group 1425 includes a receiver/transmitter 1426 that can convert signal from analog to digital upon reception and from digital to analog upon transmission. In addition, receiver/transmitter can divide a single data stream into multiple, parallel data stream or perform the reciprocal operation. Coupled to receiver/transmitter 1426 is a multiplexer/demultiplexer 1427 that facilitates manipulation of signal in time and frequency space. Electronic component 1427 can multiplex information (data and control) according to various multiplexing schemes such as OFDM. In addition, mux/demux component 1427 can scramble and spread information (e.g., codes) according to substantially any code known in the art; e.g., Hadamard-Walsh codes, Baker codes, and so on. A modulator/demodulator 1428 is also a part of operational group 1425, and can modulate information according to multiple modulation techniques, such as frequency modulation, amplitude modulation (e.g., M-ary quadrature amplitude modulation (QAM), with M a positive integer), phase-shift keying (PSK), and the like.

Access point 1410 also includes a processor 1435 configured to confer functionality, at least partially, to substantially any electronic component in access point 1410. In particular, processor 1435 can facilitate Boolean operation associated with scan group generator 1445 according to aspects disclosed herein. In addition, processor 1435 can facilitate operations on data (e.g., symbols, bits, or chips) for multiplexing/demultiplexing, such as effecting direct and inverse fast Fourier transforms, selection of modulation rates, selection of data packet formats, etc. A memory 1455 can store data structure, code instructions, system information, look-up tables, code sequences for scrambling, spreading and pilot transmission, floor plan configuration, access point deployment and frequency plans, scheduling policies, and so on. Processor 1434 is coupled to the memory 1455 in order to store and retrieve information necessary for operation of group 1425 and other aspects of access point 1410.

Various aspects or features described herein may be implemented as a method, apparatus, or article of manufacture using standard programming and/or engineering techniques. Moreover, aspects of the subject innovation can be implemented on emulated hardware; wherein software emulates hardware, providing "virtual" machines with the functionalities described herein. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other computer-readable media for storing information. The term "computer-readable medium" can include, without being limited to, wireless channels and various other media capable of storing, containing, and/or carrying instruction(s) and/or data.

As it employed in the subject specification, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and substantially any other information store such as, but not limited to, a customer demographics store, a product catalog store, product technical specification store, a learning/training material store, a service provider store information store, and the like. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "possess", "possessing", and variants thereof are used in the subject specification, these terms are intended to be inclusive in a manner similar to the term "comprising."

What is claimed is:

1. A method for generating Boolean channel masks in a wireless communication environment, the method comprising:
   receiving a set of scan data indicators, each element in the set of scan indicators is a binary sequence wherein each bit conveys a channel quality and/or presence indication;
   determining a set of three scan variables {A, B, C} associated with the set of scan data indicators; and
   computing a set of four scan groups applying Boolean operations.

2. The method of claim 1, wherein
   the first scan group $G_I = A \cap B \cap C$,
   the second scan group $G_{II} = [(A \cap B) \cup (B \cap C) \cup (C \cap A)] \cap \overline{G_I}$,
   the third scan group $G_{III} = [(A \cup B \cup C) \cap \overline{G_I}] \cap \overline{G_{II}}$ and
   the fourth scan group $G_{IV} = \overline{A \cup B \cup C}$.

3. The method of claim 2, when the set of scan data indicators comprises a single scan data indicator, determining a set of three scan variables {A, B, C} associated with the received scan data indicators includes:
   setting a first scan variable equal to the received scan data indicator;
   setting a second scan variable equal to the received scan data indicator; and
   setting a third scan variable equal to the received scan data indicator.

4. The method of claim 2, when the set of scan data indicators comprises two scan data indicators, determining a set of three scan variables {A, B, C} associated with the received scan data indicators includes:
   setting a first scan variable equal to the first received scan data indicator;
   setting a second scan variable equal to the second received scan data indicator; and
   setting a third scan variable equal to the first received scan data indicator or to the second received scan data indicator.

5. The method of claim 2, when the set of scan data indicators comprises three scan data indicators, determining a set of three scan variables {A, B, C} associated with the received scan data indicators includes:
   setting a first scan variable equal to the first received scan data indicator;
   setting a second scan variable equal to the second received scan data indicator; and
   setting a third scan variable equal to the third received scan data indicator.

6. The method of claim 2, further comprising:
   scanning a set of channels according to $G_I$;
   scanning a set of channels according to $G_{II}$ when scanning the set of channels according to $G_I$ fails; and
   scanning a set of channels according to $G_{III}$ when scanning the set of channels according to $G_{II}$ fails.

7. The method of claim 1, the binary sequence is N-bit long wherein N is a number of wireless communication channels.

8. The method of claim 3, wherein binary "1" in a N-bit word in the binary sequence indicates a strong communication channel and binary "0" indicates a weak communication channel.

9. A computer program product comprising a non-transitory computer-readable medium including code stored thereon that, when executed by a processor, cause the processor to carry out the following acts:
   receiving a set of scan data indicators, each element in the set of scan indicators is a binary sequence wherein each bit conveys a channel quality and/or presence indication;
   determining a set of three scan variables {A, B, C} associated with the set of scan data indicators; and
   computing a set of four scan groups applying Boolean operations wherein
   the first scan group equals $A \cap B \cap C$,
   the second scan group equals $[(A \cap B) \cup (B \cap C) \cup (C \cap A)] \cap \overline{G_I}$,
   the third scan group equals $[(A \cup B \cup C) \cap \overline{G_I}] \cap \overline{G_{II}}$, and
   the fourth scan group equals $\overline{A \cup B \cup C}$.

10. A wireless device comprising:
    a component that receives a set of scan data indicators, each element in the set of scan indicators is a binary sequence wherein each bit conveys a channel quality indication;
    the component determines a set of three scan variables {A, B, C} associated with the set of scan data indicators;
    the component computes a set of four scan groups applying Boolean operations;
    a scanner component that scans a set of channels based at least in part on the computed scan groups.

11. The wireless device of claim 10, wherein
    the first scan group equals $A \cap B \cap C$;
    the second scan group equals $[(A \cap B) \cup (B \cap C) \cup (C \cap A)] \cap \overline{G_I}$;
    the third scan group equals $[(A \cup B \cup C) \cap \overline{G_I}] \cap \overline{G_{II}}$; and
    the fourth scan group equals $\overline{A \cup B \cup C}$.

12. The wireless device of claim 10, when the set of scan data indicators comprises three scan data indicators, the component that determines the set of three scan variables {A, B, C} associated with the received scan data indicators establishes:
    a first scan variable equals the first received scan data indicator;
    a second scan variable equals the second received scan data indicator; and
    a third scan variable equals the third received scan data indicator.

13. The wireless device of claim 10, wherein the scanner component scans
    a set of channels according to the first scan group;
    a set of channels according to second scan group when the scan of the set of channels according to the first group fails; and
    a set of channels according to the third group when the scan of the set of channels according to second group fails.

14. An apparatus that operated in a wireless environment, the apparatus comprising:
    means for receiving a set of scan data indicators;
    means for determining a set of scan variables associated with the set of scan data indicators;
    means for computing a set of three Boolean channel masks;
    means for scanning a set of channels based at least in part on the Boolean channel masks.

* * * * *

UNITED STATES PATENT AND TRADEMARK OFFICE
CERTIFICATE OF CORRECTION

| | | |
|---|---|---|
| PATENT NO. | : 8,095,131 B2 | Page 1 of 1 |
| APPLICATION NO. | : 12/055928 | |
| DATED | : January 10, 2012 | |
| INVENTOR(S) | : Yacono | |

It is certified that error appears in the above-identified patent and that said Letters Patent is hereby corrected as shown below:

In the Specification

In Column 9, Line 60, delete "420G" and insert -- $420_G$ --, therefor.

In Column 12, Line 23, delete "$G_{III}$" and insert -- $G_{II}$ --, therefor.

In Column 12, Line 27, delete "$G_{III}$" and insert -- $G_{II}$ --, therefor.

In Column 12, Line 65, delete "e." and insert -- e.g., --, therefor.

In the Claims

In Column 20, Line 1, in Claim 8, delete "3," and insert -- 7, --, therefor.

Signed and Sealed this
Twenty-fourth Day of September, 2013

Teresa Stanek Rea
*Deputy Director of the United States Patent and Trademark Office*